J. O. DAVY.
Harvester-Rakes.

No. 148,424. Patented March 10, 1874.

Witnesses:
H. H. Cumback
Amos Wolfe

Inventor:
J. O. Davy

UNITED STATES PATENT OFFICE.

JESSE O. DAVY, OF SPRINGFIELD, OHIO.

IMPROVEMENT IN HARVESTER-RAKES.

Specification forming part of Letters Patent No. 148,424, dated March 10, 1874; application filed November 24, 1873.

*To all whom it may concern:*

Be it known that I, JESSE O. DAVY, of Springfield, Clarke county and State of Ohio, have invented a certain new and useful Improvement in Rake-Head or Beater for Grain-Harvesters, of which the following is a specification:

The object of my invention is to raise the inclining uncut grain, and to prevent the cut grain from falling or being blown in various directions when cut, and also to deposit the same in symmetrical and even sheaves, thus greatly facilitating the binding, and saving labor in binding and handling the sheaves. To this end it consists in the arrangement and combination of devices, as more particularly hereinafter described and claimed, reference being had to the accompanying drawing forming part of this specification.

Figure 1:
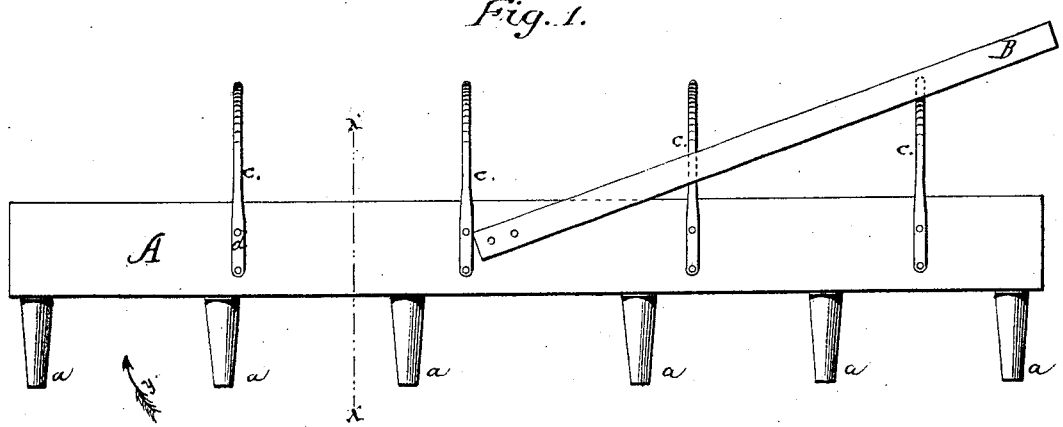
Figure 2:
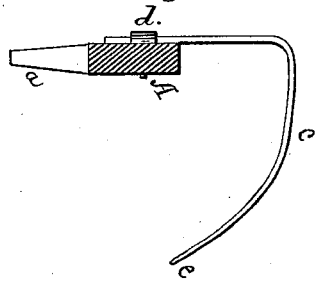

In the drawing, Figure 1 is a rear view of a rake-head with my improvement attached; and Fig. 2, a cross-section thereof on line $x\,x$, Fig. 1.

A represents a rake-head of any ordinary or approved construction, and of which there are the usual number. $a\,a\,a$, &c., are the ordinary rake-teeth attached. To the head A I attach, by any suitable fastening, (shown at $d$,) a number of curved rods or fingers, C, &c. These rods or fingers are preferably, though not necessarily, elastic, and curved over and downward toward the front of the head, so as to enter the grain before the ordinary teeth $a$, as shown in Fig. 2. Their operation is as follows: As the rake revolves in the direction indicated by arrow $y$, Fig. 1, these rods or fingers C enter the grain, first raising the inclining uncut grain, dividing and holding it in a proper position to the cutter-bar until cut, then guiding it so that it falls in a proper position on the platform; and when the teeth $a\,a$ commence to rake the cut grain up, the curved rods or fingers C, by their curved ends, prevent the grain from being thrown or blown off the platform in disorder, and hold it in a compact bundle, and so drop it to the ground from the platform at proper intervals.

Having thus described my invention, what I claim, and desire to secure by Letters Patent, is—

The combination, with a rake-head or beater, of the curved fingers or rods C, substantially as and for the purpose set forth.

JESSE O. DAVY.

Witnesses:
AMOS WOLFE,
HERBERT H. CUMBACK.